United States Patent Office 3,211,068
Patented Oct. 12, 1965

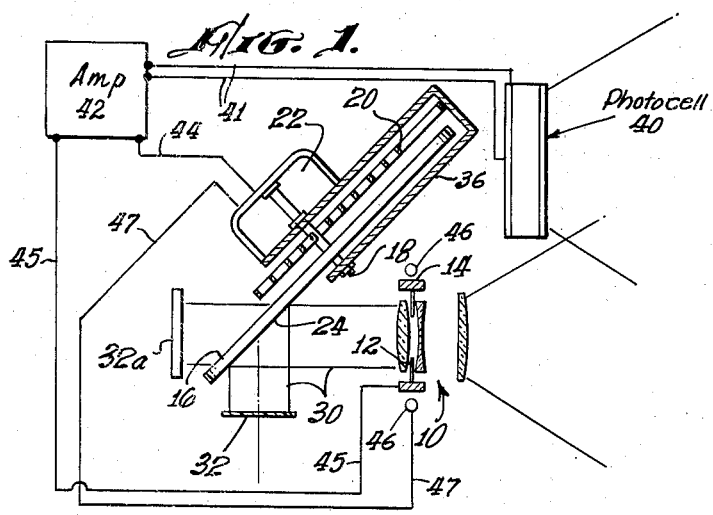
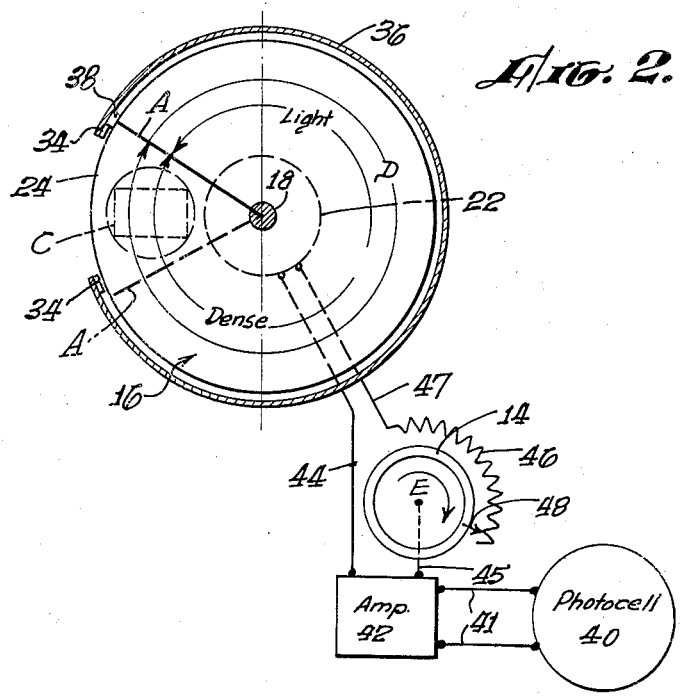

3,211,068
EXPOSURE CONTROLLING SYSTEM FOR CAMERAS
George A. Mitchell, 687 Prospect Crescent, Pasadena, Calif.
Filed Sept. 24, 1962, Ser. No. 225,730
6 Claims. (Cl. 95—10)

This invention has to do with automatic exposure control for cameras and the like. The control system is preferably characterized by a movable graduated light passing or reflective member, preferably in the form of a graduated reflective transparent disk, rotatively moved in accordance with received light and under the control of the photographic lens diaphragm or iris.

The general purpose and accomplishment of the invention is to automatically set a uniform and proper exposure intensity for any particular film or other actinic element, controlled by the light intensity received by the photographic objective and by the independent setting of the lens diaphragm or iris.

The invention will be best understood by reference to the following detailed description of a preferred and illustrative embodiment, with reference to the accompanying schematic drawings, in which:

FIG. 1 is a schematic in the plane of the principal optical axis; and

FIG. 2 is a schematic illustrating the co-relation between the graduated disk and the several control elements.

In FIG. 1 a photographic lens is shown at 10, its adjustable light stopping iris at 12, and the iris operating ring at 14. Behind lens 10 a rotative disk 16 is mounted on a central shaft 18, rotated in one direction by a spring 20 and in the other direction by an electrically responsive instrument 22, such as a galvanometer or similar instrument responsive rotatively to varying voltage or amperage. The spring 20, or its equivalent, may be a part of that instrument. For reasons that will appear, disk 16 is preferably transparent, lies in a plane at an acute angle to, and extending across, the optical axis of objective 10, and is coated on its face 24 facing lens 10 with a semi-light passing and semi-reflective coating. The coating is graduated in density from light to dense, the graduated reflectivity being concomitantly small and large and the light passing transparency correspondingly large and small. In the aspect of FIG. 2, which shows a face view of the disk, the coating may be of least density and of least reflectivity at the full line designated A, and then progressively more dense and more reflective in the direction indicated by arrow D, around to that line A. The relatively light and dense reflective areas are so indicated. The area on the disk, reflective of the light beam 30 from lens 10 to film 32 is indicated at C in FIG. 2. As shown there, disk 16 is rotative between two terminal positions determined or limited by stops 34 on case 36 and a stop 38 on the disk. As shown in FIG. 2 disk rotation in direction D is stopped with line A in the position shown by the broken line. In the disk position shown in full lines in FIG. 2, the disk area at C is most reflective, for minimum light intensity received by objective 10 as transmitted by it, as will appear. As that light intensity increases, the action of instrument 22 is to rotate disk 16 in the direction indicated by the arrow D, bringing progressively lesser reflective portions of the disk to the reflection area C.

A photo-cell 40 is positioned to receive the same light intensity at the same viewing angle as the objective 10. Photo-cell 40, subject to variable resistance 46 set by the independent adjustment of lens iris 12, energizes instrument 22 to cause 22 to rotate disk 16 in the direction D proportionately to the light intensity on the cell and to its commensurately delivered output. As schematically indicated in FIGS. 1 and 2, the output from cell 40 may go via lines 41 to an amplifier 42 which then delivers an amplified output to instrument 22 via lines 44, 45, 47 and variable resistance 46. As diagrammatically shown in FIG. 2, resistance 46 is travelled by a contact 48 connected to iris operating ring 14, to which 45 connects. Assuming that ring 14, and contact 48 rotate in the direction indicated in FIG. 2 by arrow E to close the lens iris, contact 48 moves on resistance 46 to commensurately increase the resistance at 46.

Assuming, for instance, that output is delivered from the photo-cell and its amplifier, if used, proportionately to the light intensity falling on the cell, and assuming that instrument 22 rotates disk 16 in direction D through angles proportionate to that delivered output, then the denisty and reflective graduation on disk 16 will be correspondingly uniform. The resistance at 46 will be varied, by the independent setting of the iris 12, inversely in proportion to the open diaphragm area of iris 12. For actinic films of different speeds, the connection of contact 48 with iris ring 14 may be appropriately shifted; or resistance 46 as a unit may be shifted along the path of travel of 48.

With any particular setting of the lens iris and of its variable resistance 46 the action of photocell 40 is to increase the current delivered to instrument 22 with increasing light intensity received by 40 and the photographic objective, thus causing 22 to rotate reflective disk 16 in direction D to decrease the reflectivity at the area C. Decreasing received light intensity has the opposite effect, increasing the reflectivity at area C. Thus, the exposure of the film by reflection at C is kept uniform.

For any particular received light intensity the independent iris setting, increasing resistance 46 as the iris is closed down, and decreasing that resistance as the iris is opened up, varies the current to 22 in proportion to the changing iris opening. At larger iris openings instrument 22 thus rotates disk 16 further in the direction D to decrease the reflectivity at area C, and to increase reflectivity at that film exposure area at smaller iris openings; thus again keeping the film exposure uniform for different iris openings.

The film exposure is thus under the combined control of both the photocell and the independently settable iris. Assume, for instance, that with any given iris and its resistance setting the photocell current actuating the instrument 22 through the set resistance moves element 16 to the then correct position to throw the proper light intensity on the film for exposure. The camera man, viewing the image, decides he wants, say, a sharper image. To get that sharper image he closes the iris down. In doing that, he increases the resistance at 46, thereby decreasing the current flow through instrument 22. That decreased current then causes instrument 22 to back up the element 16, in the direction opposite to D, to increase the reflectivity of 16 to the film at C.

The opposite takes place if the camera man decides he wants a hazier picture and, for that purpose, opens up the iris and thus decreases the iris resistance at 46. The resultant increased current flow through 22 causes that instrument to rotate 16 in direction D to decrease the reflectivity of 16 at C and thus to commensurately cut down the light intensity on the film.

As is obvious, instead of utilizing the graduated reflectivity of disk 16, its graduated light passing transparency might be utilized, with film 32 placed on the main optical axis of lens 10 behind the disk, which may then be placed in a plane normal to the objective axis. In that case either the direction of density graduation on the disk would be reversed, or the direction of disk rotation with increasing light intensity and current output be reversed. It is preferred however to utilize facial reflection from the disk or other moving graduated member, as that obviates the glass path through that member and requires only that its one reflective face be optically flat.

Within the broad context of the invention, the rotating graduated disk may be replaced by a graduated member such as a slip of glass graduated and moved rectilinearly. The rotatable disk is preferred, however, for its simplicity of mounting and movement.

In FIG. 1 a view finder element, such as a ground glass 32a, is shown in position behind transparent disk 16 at the same optical distance from objective 10 as is film 32. That view finder element takes that part of the image forming beam that is not reflected to film 32 but is transparently passed through 16. Consequently, for any given manual or other independent setting of the iris 12, the graduated movable disk 16 automatically divides the image forming beam between the film and the view finder, passing to the view finder all the light that is not automatically selected for film exposure. It is obvious that, as explained above, the film may be positioned to take the transparently passed part of the beam; that is, the positions of the film and the view finder element may be interchanged.

For the purpose of defining the invention broadly to include both or either varied transparent light passing and varied light reflection at disk 16 or its equivalent, the terms "convey" and "conveyance" are here adopted in the following claims to mean and include either such transparent light passing or light reflection.

I claim:

1. An exposure controlling system for cameras or the like, comprising in combination with an objective lens, a diaphragm associated with the lens and adjustable in size of aperture to adjustably set the effective aperture of the lens, and an actinic image receiving element at the image plan of the lens;
   a light conveying member extending across the light beam of the lens between it and the actinic element,
   said member being movable in opposite directions along a predetermined line of movement and having a factor of conveyance of said light beam graduated in one direction of said movement, so that in its movements in opposite directions along said line of movement said member conveys to the actinic element relatively more or less light intensity from said lens,
   a photoelectric element oriented to receive substantially the same light intensity as the objective lens and having an electrical current output varying with its received light intensity,
   an electrically responsive instrument coupled to the movable graduated conveying member and acting to move said member in opposite directions along its line of movement proportionately to its received current,
   said beam controlling diaphragm being adjustable as to its aperture size independently of the action of said instrument,
   a resistance variable by virtue of the independent adjustment of the aperture size of said diaphragm,
   electrical coupling involving an electrical circuit through which the varying electrical output of the photoelectric element is applied to said electrically responsive instrument,
   and said diaphragm variable resistance variably controlling the application of said output to said instrument.

2. An exposure controlling system for cameras or the like, comprising in combination with an objective lens, a diaphragm associated with the lens and adjustable in size of aperture to adjustably set the effective aperture of the lens, and an actinic image receiving element at the image plane of the lens;
   a light conveying member extending across the light beam of the lens between it and the actinic element,
   said member being movable in opposite directions along a predetermined line of movement and having a factor of conveyance of said light beam graduated in one direction of said movement, so that in its movements in opposite directions along said line of movement said member conveys to the actinic element relatively more or less light intensity from said lens,
   a photoelectric element oriented to receive substantially the same light intensity as the objective lens and having an electrical current output varying with its received light intensity,
   an electrically responsive instrument coupled to the movable graduated conveying member and acting to move said member in opposite directions along its line of movement proportionately to its received current,
   said beam controlling diaphragm being adjustable as to its aperture size independently of the action of said instrument,
   a resistance variable by virtue of the independent adjustment of the aperture size of said diaphragm,
   and electrical coupling involving an electrical circuit including in series said resistance, said electrically responsive instrument and the output of the photoelectric element.

3. The combination defined in claim 2 and in which said electrically responsive instrument moves said light conveying member in a predetermined direction to increase the light conveyance to the actinic element, and in which closure of the aperture size of the beam controlling diaphragm varies said resistance in the direction to cause said electrically responsive instrument to move said light conveying member in the direction to increase the light conveyance to the actinic element.

4. The combination defined in claim 1 and in which said electrically responsive instrument moves said light conveying member in a predetermined direction to increase the light conveyance to the actinic element, and in which closure of the aperture size of the beam controlling diaphragm varies said resistance in the direction to cause said electrically responsive instrument to move said light conveying member in the direction to increase the light conveyance to the actinic element.

5. The combination defined in claim 1 and in which the physical relation between said variable resistance and the aperture size controlling diaphragm is adjustable for accommodation of actinic elements of differing sensitivities.

6. The combination defined in claim 1 and in which said light conveying member is located in a plane making an acute angle to the axis of the light beam of the lens,
   said member having a semi-reflectivity graduated in a direction of said movement and having a light passing semi-transparency graduated oppositely to the reflective graduation, said graduated reflectivity and light passing transparency dividing the light beam of the lens into sub-beams of varying intensity, said actinic image receiving element being located at the lens image plane of one of said sub-beams, and a view finder element located at the lens image plane of the other of said sub-beams.

References Cited by the Examiner

UNITED STATES PATENTS

| 2,154,324 | 4/39 | Couyoumdjian | 95—10 |
| 3,003,389 | 10/61 | Stimson | 95—10 X |
| 3,017,813 | 1/62 | Greger | 95—10 |
| 3,044,375 | 7/62 | Schafer | 95—10 |
| 3,052,168 | 9/62 | Reed | 95—10 |

FOREIGN PATENTS

| 511,229 | 8/39 | Great Britain. |

NORTON ANSHER, *Primary Examiner.*

D. B. LOWE, *Examiner.*